United States Patent [19]
Scott

[11] 4,016,402
[45] Apr. 5, 1977

[54] WATER HEATER CONTROL SYSTEM

[76] Inventor: Kenneth W. Scott, 601 Ninth St., Coronado, Calif. 92118

[22] Filed: Aug. 27, 1975

[21] Appl. No.: 608,092

[52] U.S. Cl. .............................. 219/334; 219/328
[51] Int. Cl.² ........................................ F24H 1/00
[58] Field of Search ........................ 219/327–331, 219/334, 337, 519; 236/20; 237/16, 19; 122/13 A

[56] References Cited
UNITED STATES PATENTS 2,779,855  1/1957  Sawyer ........................ 219/328 X
2,843,717  7/1958  Tracy ........................... 219/328 X Primary Examiner—C. L. Albritton
Attorney, Agent, or Firm—Richard K. Macneill

[57] ABSTRACT

A water heater control system for controlling the thermostat setting on a water heater which senses the temperature on an outflow line from the water heater and energizes a control for lowering the thermostat setting during periods of low flow demand and raising the thermostat setting during periods of high demand, thereby reducing overall required heating energy.

4 Claims, 1 Drawing Figure

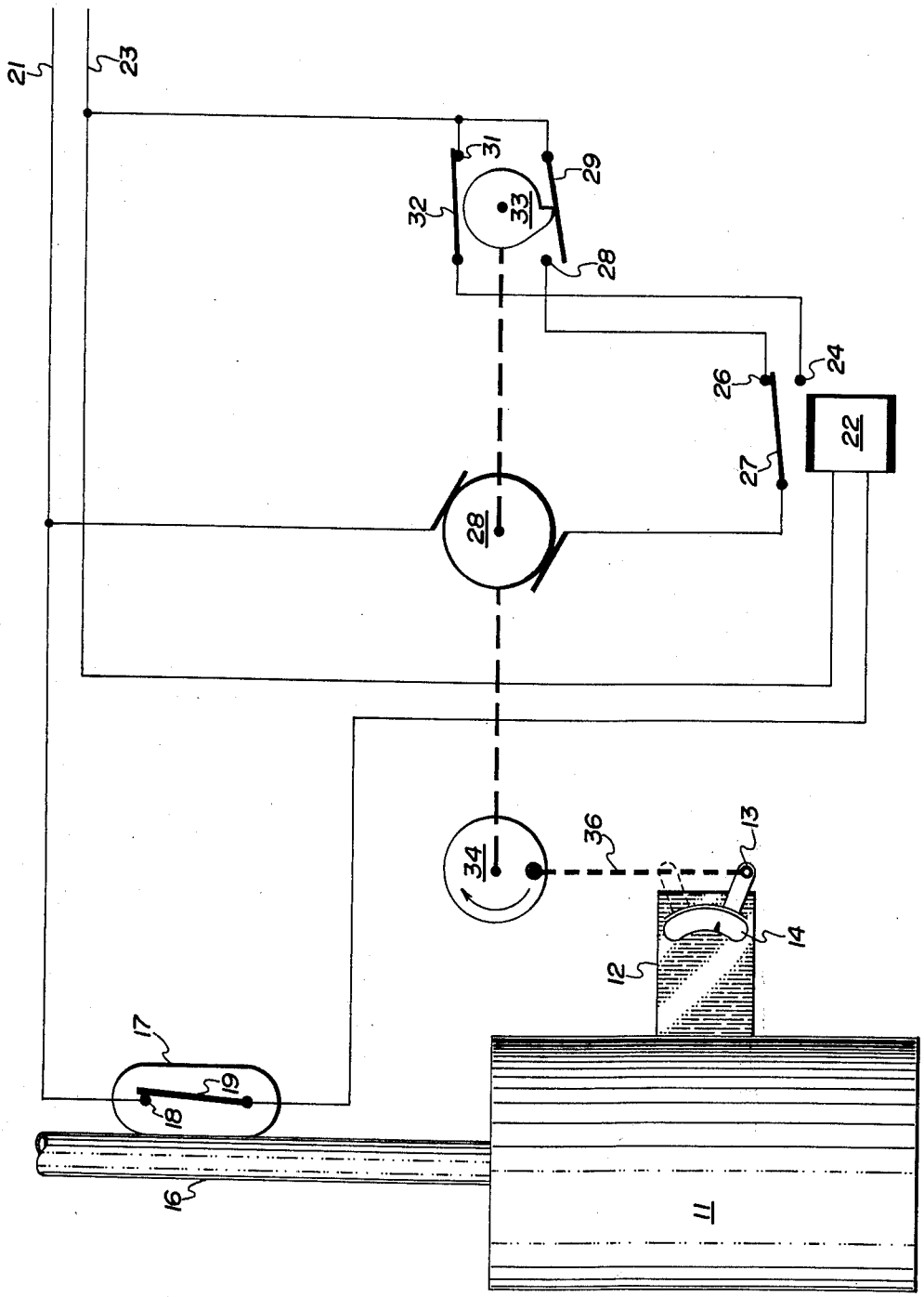

WATER HEATER CONTROL SYSTEM

BRIEF DESCRIPTION OF THE INVENTION

The present invention relates to a water heater control system and more particularly to a water heater control system which varies a heater thermostat setting according to demand.

According to the invention, a water heater control system is provided in which a thermoswitch mounted on a water outflow line from the water heater senses predetermined temperature limits and controls and actuates a relay upon reaching a predetermined low temperature. The relay supplies power to a moter which through cam-controlled switching rotates the motor a predetermined number of degrees. The motor is coupled to a thermostat control for movement to a higher position thereby heating the water to a higher temperature. This would be initiated during periods of heavy demand which in effect would overtax the water heater and lower the outgoing temperature. When the temperature of the water reaches a predetermined high, the thermoswitch opens de-energizing the relay which, through its back contacts, rotates the motor. The supply of power to the motor is supplied through a cam-operated switch which opens after a predetermined number of degrees of rotation, the motor again coupled to the thermostat control switch which returns the thermostat to its low position. This would occur during periods of low demand which would result in the heating of the water to a predetermined high end of the temperature range. A typical closing temperature for the thermoswitch would be 120° Fahrenheit, and a typical opening point for the thermoswitch would be 135° Farenheit. While this system is primarily designed for a re-circulating hot water system such as that found in apartment houses, hotels, office buildings, etc., it is also applicable to nonre-circulating water systems.

An object of the present invention is the provision of an improved water heater control system.

Another object of the invention is the provisions of a water heater control system which conserves energy during low demand periods.

A further object of the invention is the provision of a water heater control system in which low and high demand periods are automatically sensed. Yet another object of the invention is the provision of a water heater control system which utilizes conventional components and is extremely simple to install on existing water systems.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein:

The sole FIGURE is a schematic diagram of the preferred embodiment of the present invention.

DETAILED DESCRIPTION OF THE DRAWING

Referring to the drawing, hot water heater 11 has a thermostat 12 with a thermostat control arm 13 in proximity to calibration scale 14. Outflow line 16 from heater 11 has a thermoswitch 17 mounted thereon. Thermoswitch 17 has a terminal 18 and a switch arm 19. Terminal 18 is coupled to one power line 21 and switch arm 19 is coupled through solenoid 22 to power line 23. Solenoid 22 has a forward contact 24 and a back contact 26 with movable arm 27 therebetween. Movable arm 27 is coupled to one side of motor 28 and the other side of which is coupled to power line 21. Contact 26 of solenoid 22 is coupled to contact 28 of switch arm 29. Switch arm 29 is connected to incoming power line 23. Contact 24 of solenoid 22 is coupled to contact 31 of switch arm 32. Switch arm 32 is coupled to incoming power line 23 and to switch arm 29. Motor 28 is mechanically coupled to switch cam 33 and to thermostat cam 34. Thermostat cam 34 has a linkage 36 coupled to thermostat control arm 13.

OPERATION

Quiescently, the water in water heater 11 being cold, i.e., at a temperature lower than 120° Fahrenheit, and power is applied to incoming power leads 21 and 13. At this time thermoswitch 17 is in the closed position shown with switch arm 19 in contact with contact 18. Power will then be supplied to solenoid 22 pulling relay arm 27 into electrical contact with contact 24. At this time power is applied to motor 28 from incoming power line 21, relay arm 27, and relay contact 24 through contact 31, switch arm 32 back to the other side of the incoming line 23. Motor 28 will then rotate until cam 33 opens switch arm 32 removing power from motor 28. At the same time, cam 34 has rotated with linkage 36 pulling thermostat control arm 13 upwardly to a predetermined high position. Hot water heater 11 will turn on until the temperature set by thermostat control arm 13 is attained. As long as there is average to heavy use or demand on line 16 from hot water heater 11, the temperature of the water is outflow line 16 will remain below 135° Fahrenheit and thermoswitch 17 will remain closed.

When the demand on the hot water outflow line 16 reduces to zero or to a low point, the temperature of water flowing in line 16, in a recirculating system, for example, will increase to the point that switch arm 19 of thermoswitch 17 pulls away from contact 18 and power is removed from solenoid 22. When this happens relay arm 27 returns to the position shown contacting contact 26 and, since cam 33 has rotated 180°, motor 28 will receive its power through relay arm 27, contact 26, contact 28, and switch arm 29. Motor 28 will rotate until cam 33 has rotated 180°,into the position shown, at which time the circuit to motor 28 will be broken and motor 28 will stop. While motor 28 was rotating, cam 34 was also rotating which, through linkage 36, has moved the thermostat control arm 13 to the low position. This will remain until the demand increases which lowers the temperature to 120° Fahrenheit in outflow line 16 and thermoswitch 17 is closed as shown. At this time the cycle repeats itself. It has been found empirically that a savings of from nine to twenty percent of heating energy requirements is effected by the lowering of the thermostat during periods of limited demand. This would be, for example, between 10:00 p.m. and 6:00 a.m. in a commercial system such as utilized in apartment houses, hotels, office buildings, etc.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

The invention claimed is:

1. A water heater control system comprising:

a water heater having a thermostat control thereon and an outflow line;

temperature sensing means disposed in operable proximity to said outflow line and responsive to the temperature of water in said outflow line;

thermostat setting means electrically coupled to said temperature sensing means and mechanically coupled to said thermostat control, said thermostat setting means operable for setting said thermostat control to a high temperature position when the temperature of said water in said output line reaches a predetermined low and operable for setting said thermostat to a predetermined low temperature position when said temperature of said water in said outflow line reaches a predetermined high.

2. The water heater control system of claim 1 wherein:

said temperature sensing means is a thermoswitch.

3. The water heater control system of claim 2 and further including:

a motor, said thermoswitch operable for coupling electrical energy to said motor in a closed position, said motor being mechanically coupled to said thermostat control and operable for controlling the setting thereof.

4. The water heater control system of claim 3 and further including:

a cam means mechanically coupled to said motor; and first and second electrical switches in operable proximity to said cam means, said first and second electrical switches being in serial relationship with electrical energy coupled to said motor, said cam means being operable for opening one of said electrical switches and de-energizing said motor after a predetermined rotation of said motor.

* * * * *